Figure 1:
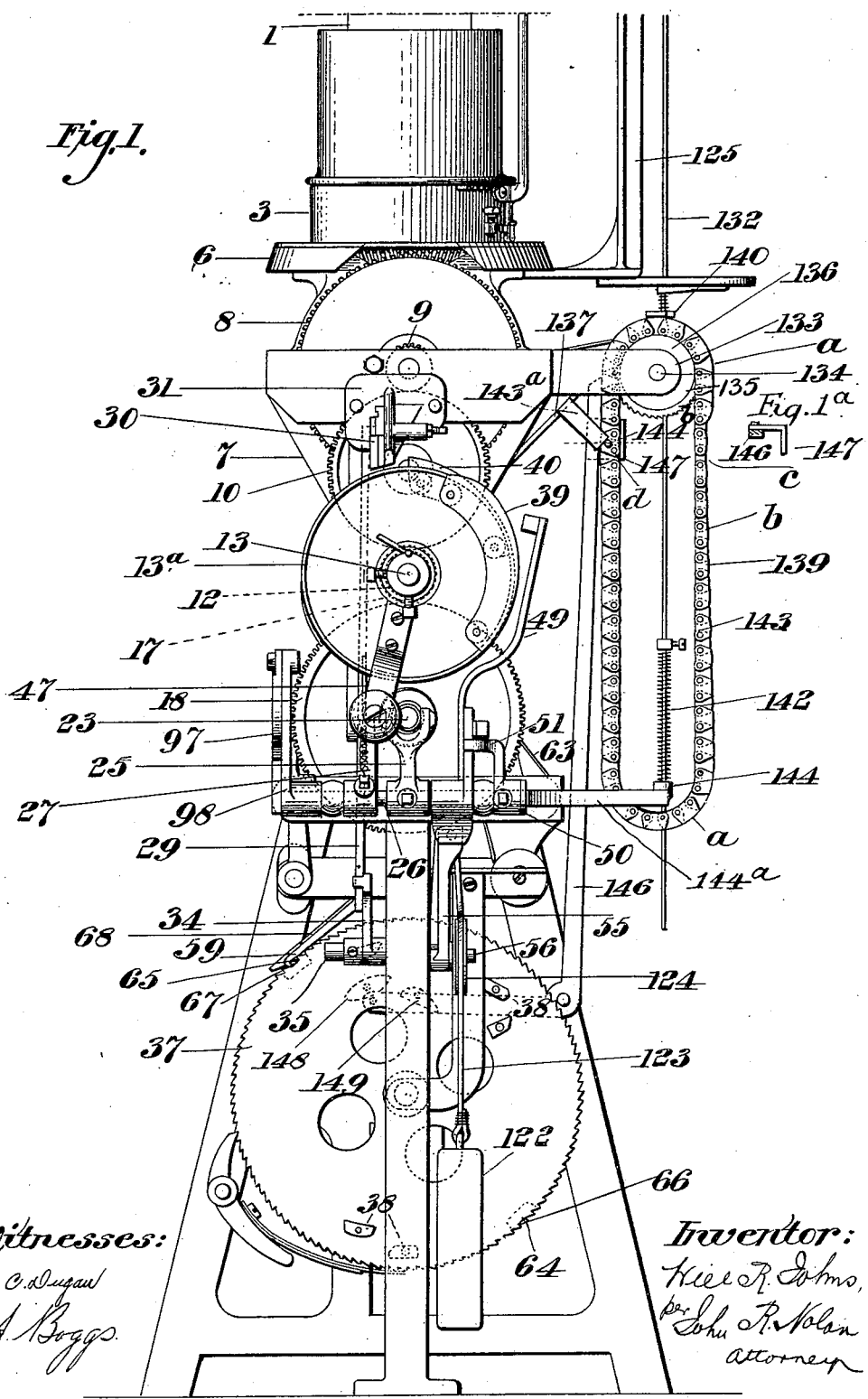

No. 678,883. Patented July 23, 1901.
W. R. JOHNS.
KNITTING MACHINE.
(Application filed Sept. 1, 1892.)
(No Model.) 8 Sheets—Sheet 1.

Witnesses:
James C. Dugan
H. A. Boggs.

Inventor:
Will R. Johns,
per John R. Nolan
attorney

No. 678,883. Patented July 23, 1901.
W. R. JOHNS.
KNITTING MACHINE.
(Application filed Sept. 1, 1892.)
(No Model.) 8 Sheets—Sheet 2.

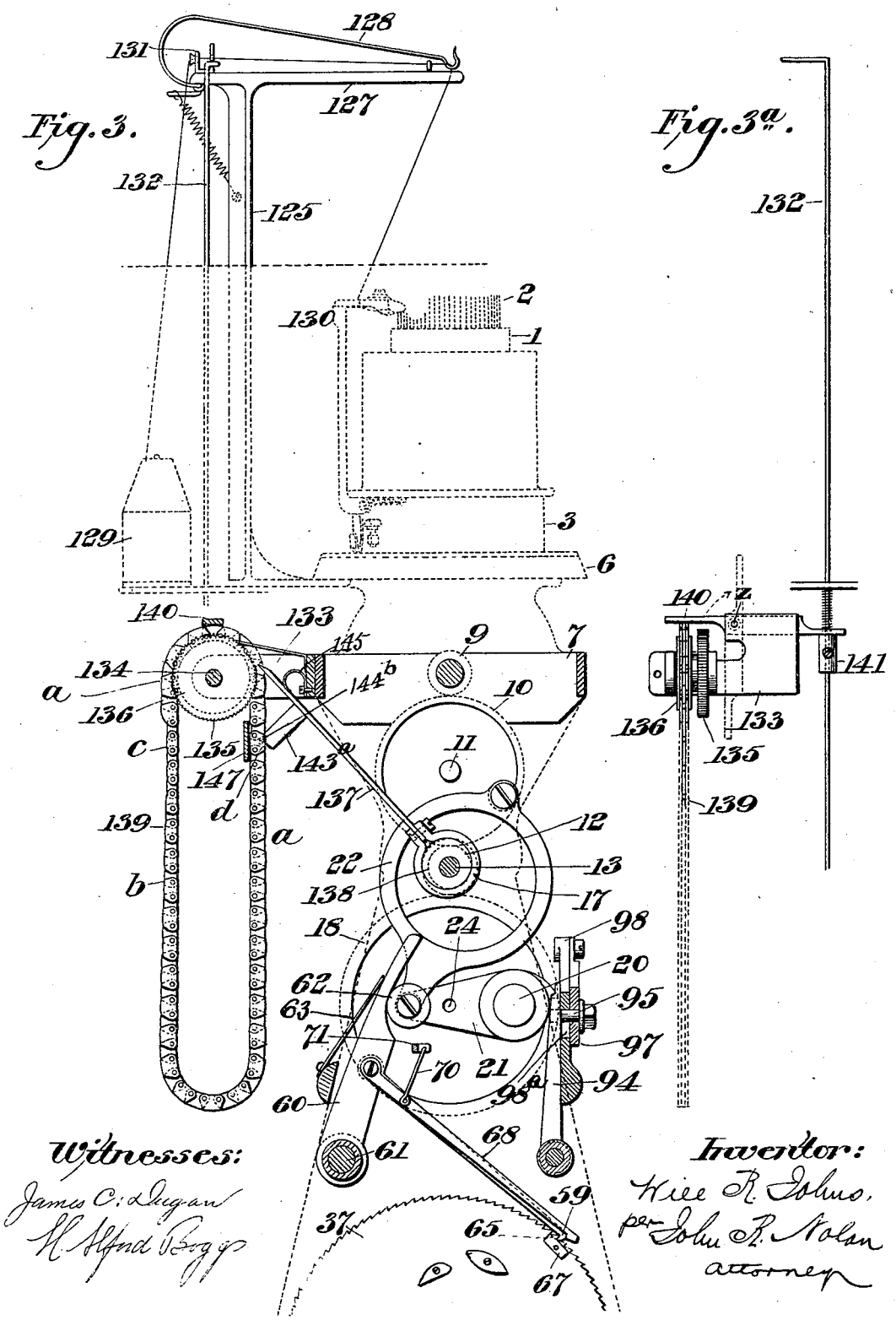

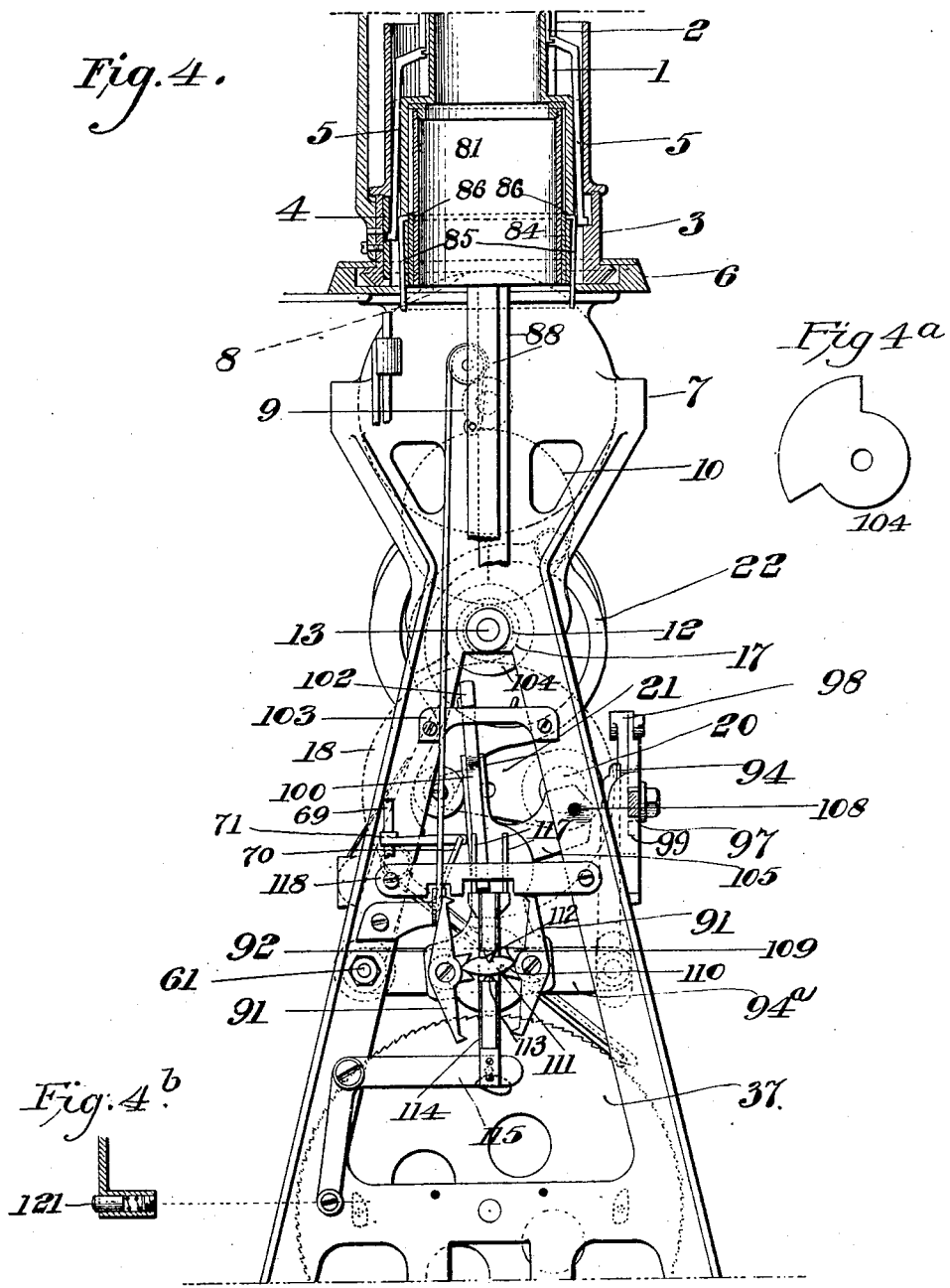

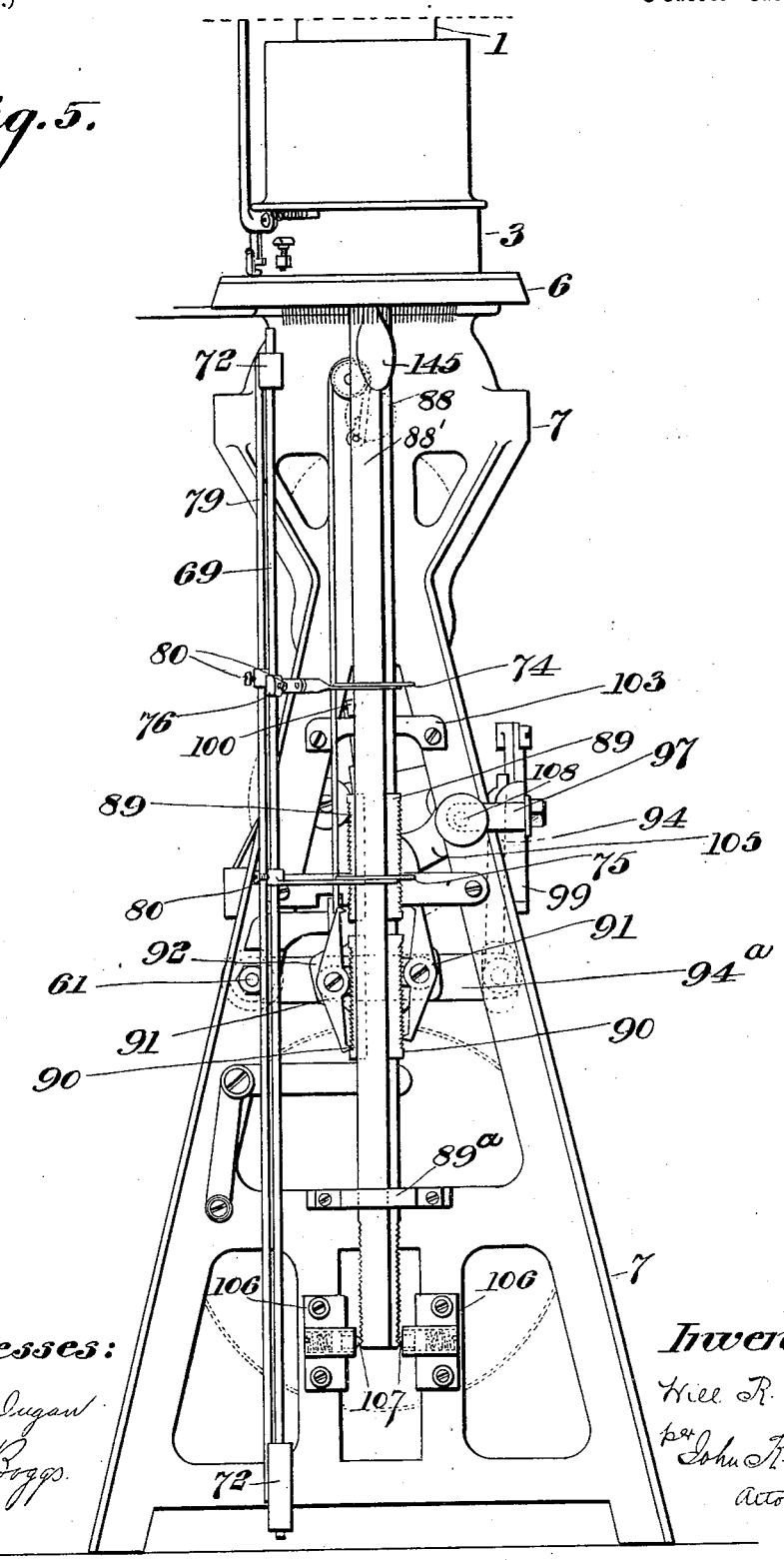

No. 678,883. Patented July 23, 1901.
W. R. JOHNS.
KNITTING MACHINE.
(Application filed Sept. 1, 1892.)
(No Model.) 8 Sheets—Sheet 6.
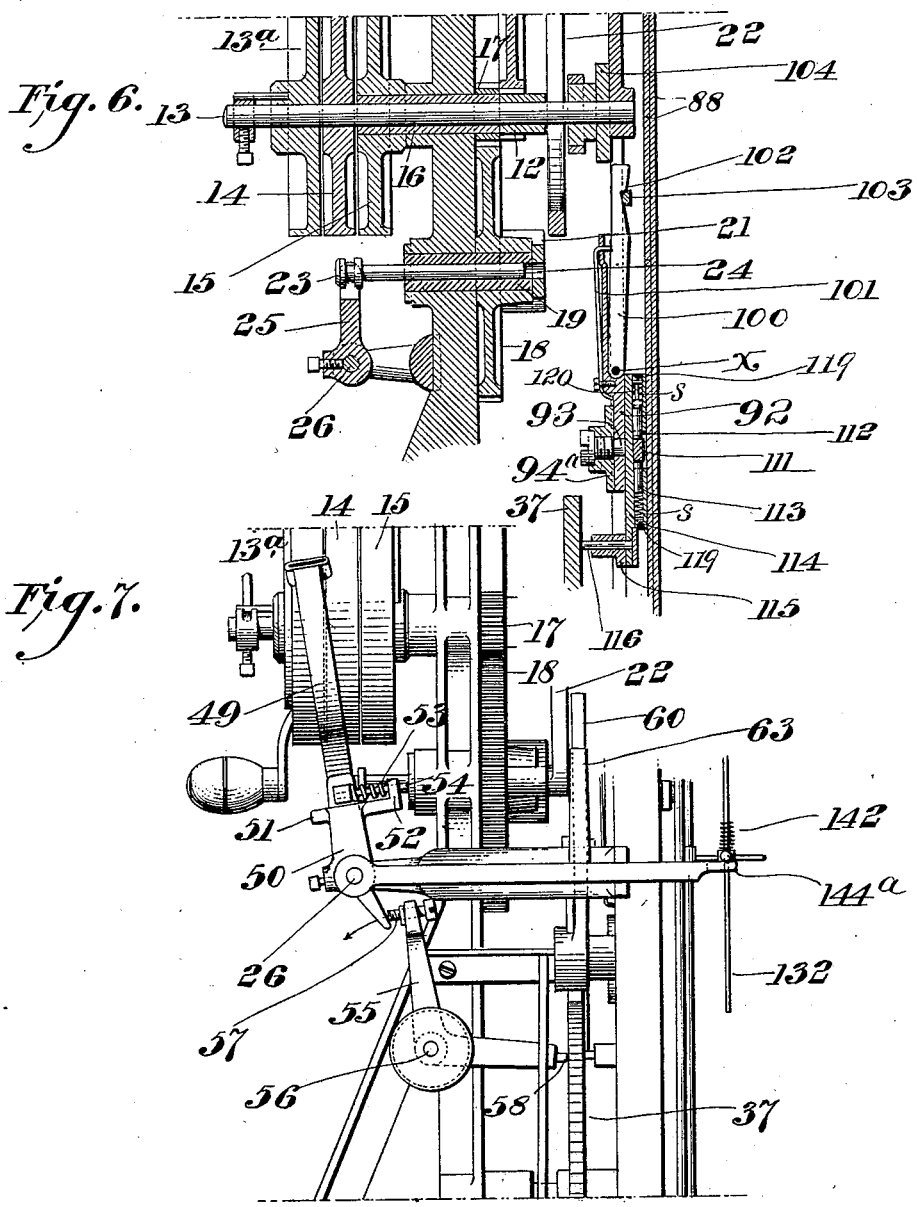
Witnesses:
James C. Dugan
H. Alfred Boggs.
Inventor:
Will R. Johns,
per John R. Nolan
Attorney No. 678,883. Patented July 23, 1901.
W. R. JOHNS.
KNITTING MACHINE.
(Application filed Sept. 1, 1892.)
(No Model.) 8 Sheets—Sheet 7.
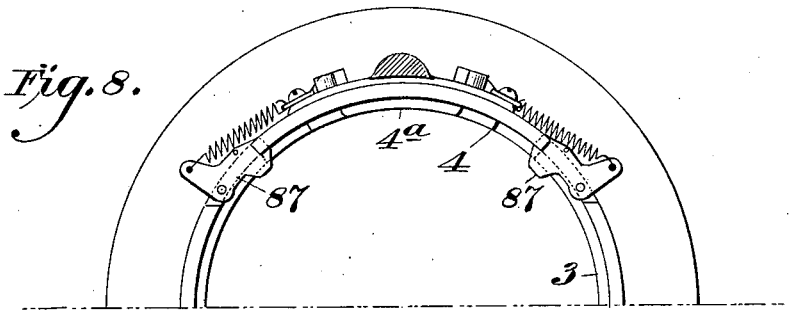
Fig. 8.
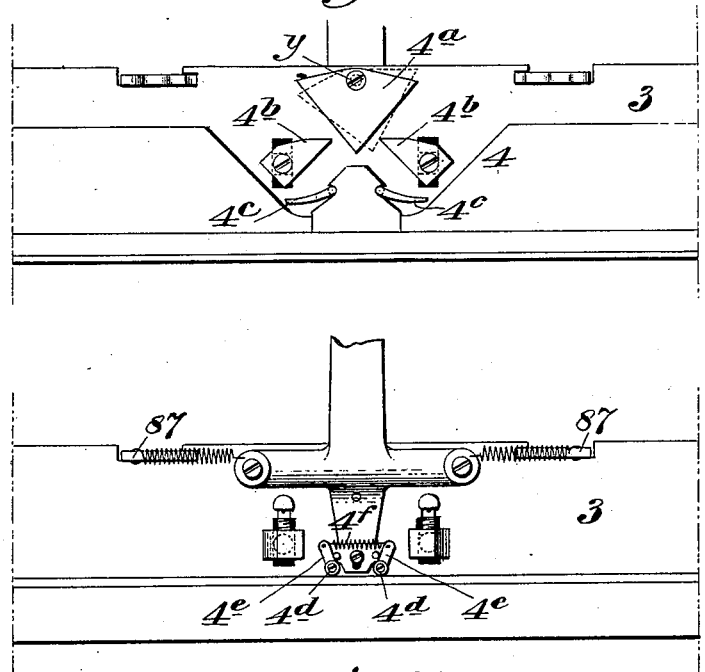
Fig. 9.
Fig. 10.
Witnesses:
James C. Dugan
H. Alfred Boggs
Inventor:
Will R. Johns,
per John R. Nolan
attorney
THE NORRIS PETERS CO., PHOTO-LITHO., WASHINGTON, D. C.

No. 678,883. Patented July 23, 1901.
W. R. JOHNS.
KNITTING MACHINE.
(Application filed Sept. 1, 1892.)
(No Model.)
8 Sheets—Sheet 8.
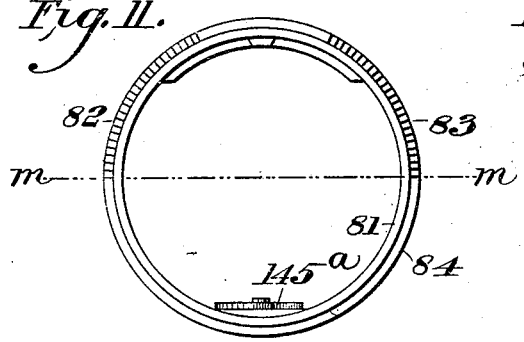
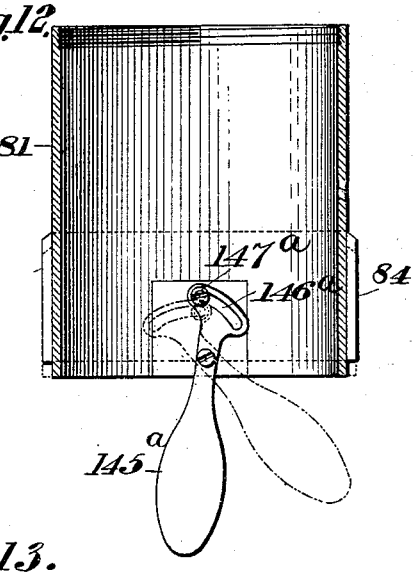
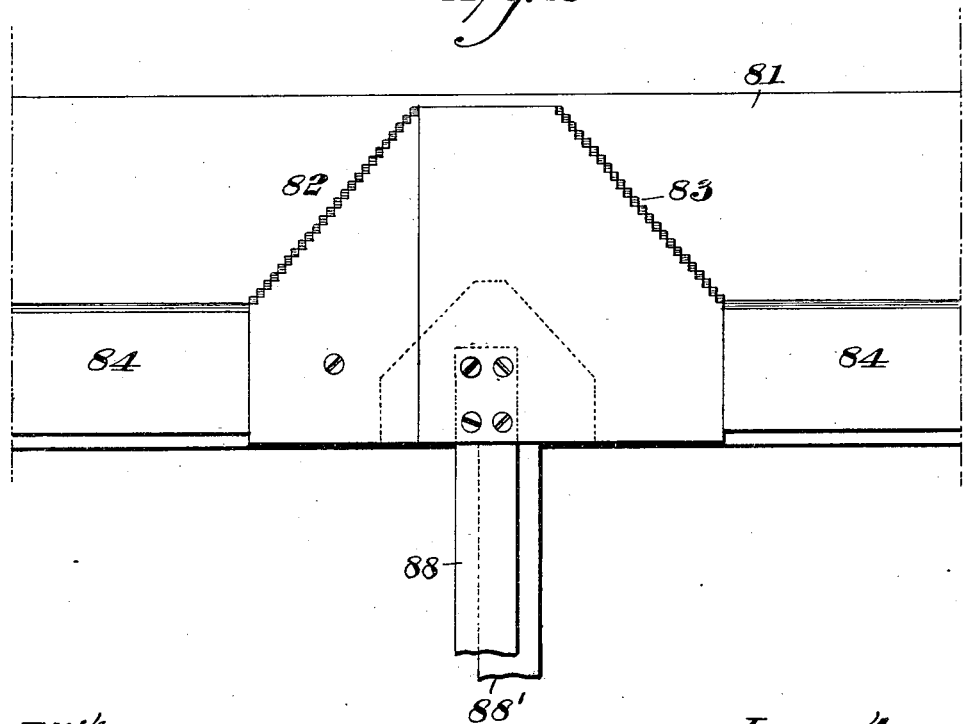
Witnesses:
James C. Dugan
H. Alford Boggs
Inventor:
Will R. Johns,
per John R. Nolan
attorney

UNITED STATES PATENT OFFICE.

WILL R. JOHNS, OF ROCKFORD, ILLINOIS, ASSIGNOR TO THE EXCELSIOR AUTOMATIC KNITTING MACHINE COMPANY, OF NORRISTOWN, PENNSYLVANIA.

KNITTING-MACHINE.

SPECIFICATION forming part of Letters Patent No. 678,883, dated July 23, 1901.

Application filed September 1, 1892. Serial No. 444,841. (No model.)

*To all whom it may concern:*

Be it known that I, WILL R. JOHNS, a citizen of the United States, residing at Rockford, in the county of Winnebago and State of Illinois, have invented certain new and useful Improvements in Knitting-Machines, of which the following is a full, clear, and exact description, reference being had to the accompanying drawings, forming a part of this specification.

This invention relates generally to improvements in that class of circular-knitting machines in which are provisions for automatically throwing certain needles out of and into action during the process of widening and narrowing the web—as, for example, in the knitting of the heel and toe parts of socks and stockings.

The improvements are designed for use more especially in connection with the mechanism set out in Letters Patent of the United States No. 456,308, granted to me July 21, 1891, to which reference may be had. The said patented mechanism comprises a needle-controlling step device located within the central opening of the needle-cylinder and adapted to rise and fall step by step at predetermined intervals in a manner to throw certain needles into action or provide for their becoming inactive.

The present improvements comprise means for automatically changing the continuous rotary movement of the knitting-cams to a rotary reciprocating movement, and the converse at certain stages of the knitting operation, means for imparting the requisite actions to the needle-controlling device during the reciprocation of the knitting-cams, and means for varying the tension of the yarn at prescribed periods, together with various novel features of construction and combination of the various elements of the machine whereby advantages are gained, as will be hereinafter fully set forth in detail and be duly claimed.

Figure 2:
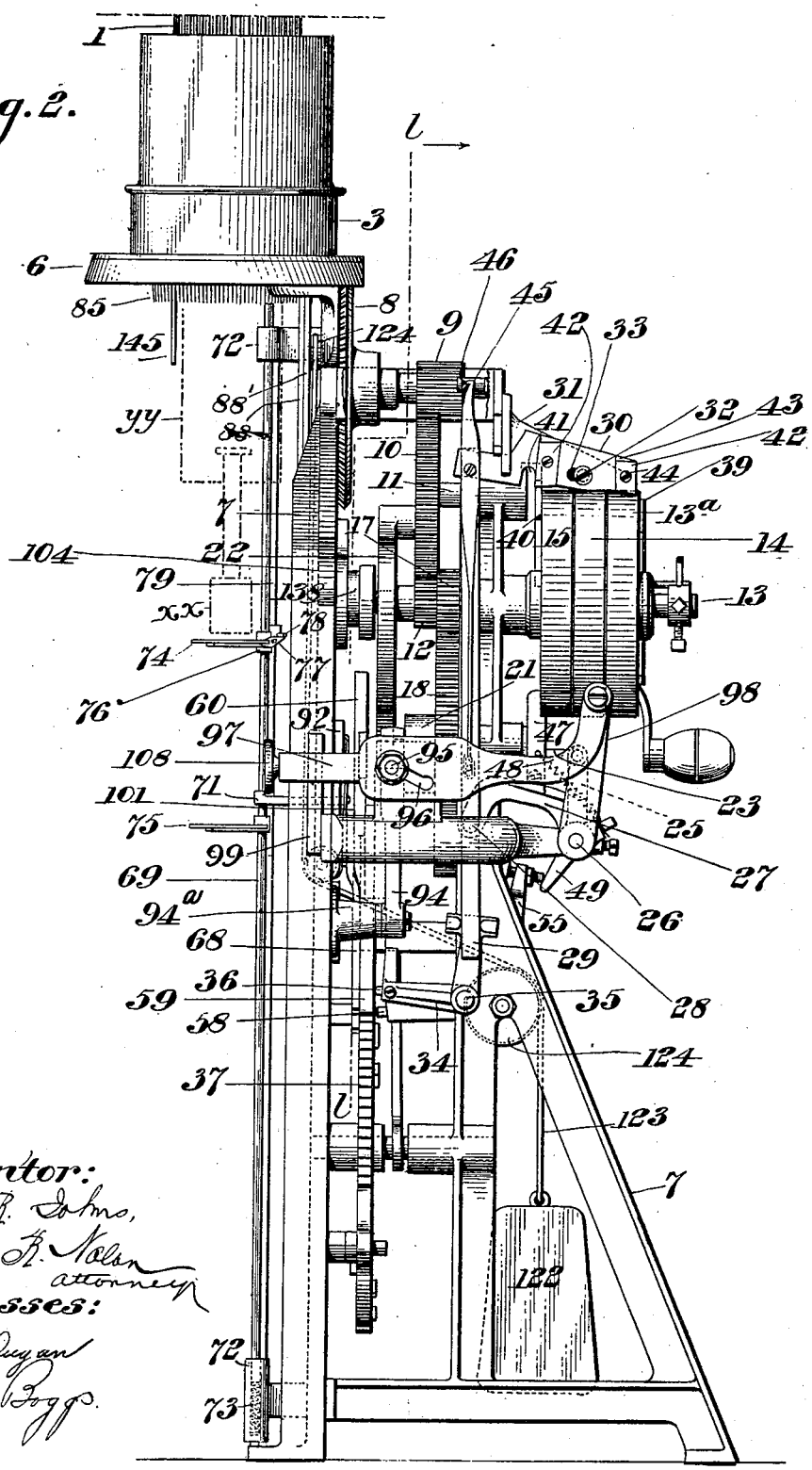

In the annexed drawings, Figure 1 is a partial end view of a knitting-machine embodying my invention. Fig. 1ª is a cross-section of the lever-arm 146 adjacent to the member 147. Fig. 2 is a side elevation of the machine, the leg-fashioning mechanism being omitted. Fig. 3 is a vertical section as on the line *l l* of Fig. 2, the said fashioning mechanism being shown and parts in front of the section-line being indicated partially in dotted outline. Fig. 3ª is a detail in end view of the main part of the leg-fashioning mechanism. Fig. 4 is a vertical section taken through the center of the needle-cylinder and adjuncts of Fig. 2, the bars for operating the needle-controlling devices being broken away to expose parts otherwise concealed. Fig. 4ª is a separate view of the cam 104, herein referred to. Fig. 4ᵇ is a sectional detail of the lower end of the crank-lever 115, showing the spring-actuated friction-pin therein. Fig. 5 is a partial end view of the machine, showing said bars in place. Fig. 6 is a partial vertical section through the body of the machine. Fig. 7 is a partial rear side view thereof. Fig. 8 is a partial plan of the cam-cylinder and its adjuncts. Figs. 9 and 10 are interior and exterior developments, respectively, of Fig. 8. Fig. 11 is a plan of the stepped section-supporting cylinder for controlling the needles during the widening and narrowing operation. Fig. 12 is a vertical section as on the line *m m* of Fig. 11. Fig. 13 is a development of Fig. 11.

The numeral 1 represents the needle-cylinder of the machine; 2, its needles; 3, the cam-cylinder; 4, the knitting-cams therein, and 5 jacks adapted periodically to connect the needles with the knitting-cams, whereby when the cam-carrier is rotated the circular series of needles will be successively reciprocated in the usual manner.

6 represents the base upon which the cam-carrier and its adjuncts are sustained, and 7 the framework for the support of said base and of the general operating mechanism. The lower edge of the cam-carrier is provided with bevel-gear teeth, with which engage the teeth of a bevel-wheel 8, as usual, whereby when the latter is rotated or oscillated a corresponding movement is imparted to the cam-carrier. On the shaft of the wheel 8 is fixed a pinion 9, with which gears a spur-wheel 10, mounted on a lower stud-shaft 11, the latter wheel being also in gear with a pinion 12 on a transverse shaft 13. One end of this shaft extends beyond the side of the frame 7 and is equipped with the fast and loose pulleys 13ª 14, respectively, so that power may be transmitted to the shaft in a manner to rotate the pinion thereon and, perforce, the cam-cylinder. Beside the pulley 14 is another pulley 15, which is fast on a sleeve 16, that loosely surrounds the shaft 13. This sleeve extends inwardly to or near to the pinion 12 and is provided on its inner end with a pinion 17, that gears with a spur-wheel 18 on a stud 19, whereby when the pulley 15 is driven the wheel is rotated, and this without affecting the shaft 13. On the face of the wheel 18 near its periphery is a stud 20, on which is loosely mounted one end of a crank-arm 21, the other end of which extends beyond the center of the wheel and is, by means of a pitman 22, connected eccentrically with the face of the spur-wheel 10. Hence when the fast pulley 13ª is driven and the spur-wheel is rotated through the action of the intermediate gearing, as above described, the pitman in its movement will simply oscillate the arm 21, no action whatever being imparted to the wheel 18. If, however, the arm 21 be fixedly secured to said wheel 18 and the latter be revolved through the action of the pinion 17, as previously stated, a rotary reciprocating movement will be imparted by means of the pitman 22 to the upper spur-wheel 10, which wheel 10 will thereupon, by virtue of the intermediate gearing, communicate a similar movement to the cam-carrier and to the shaft 13. The pitman 22 is formed with an expanded circular opening therein, as shown in Fig. 3, so as to clear the shaft 13 and permit the action of the pitman.

When the machine is knitting a straight tubular web—as, for instance, the leg or the foot of a stocking—the driving-belt is upon the pulley 13ª and the arm 21 is free to oscillate; but when the machine is performing the widening and narrowing process, as in the knitting of the heel or the toe of a stocking, the belt is upon the pulley 15 and the arm 21 is fast to the wheel 18. A means which I employ in this instance for locking the arm 21 to the wheel 18 at predetermined intervals comprises a sliding pin or bolt 23, Fig. 6, fitted to a central perforation in the stud 19 and adapted to be projected into or retracted from a perforation 24 in the crank-arm. When the pin is in register with the perforation 24, the arm 21 is fast; but when the pin is retracted therefrom the arm is free to oscillate. The outer end of this pin is connected with a clutch-arm 25, rising from a rocking shaft 26, which is borne in suitable brackets on the end of the supporting-frame. Fixed to this shaft is an arm 27, which is pivotally connected at 28, Fig. 2, with a vertical bar 29, the upper end of which bar is pivoted to an oscillatory piece 30, that extends over and above the pulleys 13ª, 14, and 15. This piece is supported upon a bracket 31, projecting from the main frame, the piece being maintained in place by means of a screw 32, the hole 33 for which in the piece is elongated to permit of the reciprocation of said piece, as and for the purpose hereinafter described. It will be obvious that if this piece be rocked or oscillated the bar 29 will be raised and lowered, thereby vibrating the arm 27 and, perforce, the rocking shaft, which latter in turn will vibrate the arm 25, and thus project the pin 23 into or retract it from the perforation in the crank-arm 21. The lower end of the bar 29 extends between a pair of bosses or projections on the vertical arm of a bell-crank lever 34, that is fulcrumed on a stud 35, suitably disposed on one side of the supporting-frame, whereby when said lever is oscillated the bar and the piece thereon will be correspondingly moved. The bar 29 oscillates about the pivotal point 28. On the free end of the horizontal arm of the lever 34 is a stud 36, which projects to or near to the face of a pattern-wheel 37, to which a step-by-step movement is imparted at certain periods by means of devices hereinafter mentioned. Fixed to the face of this wheel 37 are tappet-blocks 38, which are adapted during the rotation of the wheel to impinge against the stud 36 and impart the requisite movement or movements to the lever, as below described.

On the outer faces of the pulleys 13ª and 15 are secured segments 39 and 40, respectively, the outer edges of which project beyond the peripheries of the pulleys and constitute, in effect, cams. When the driving-belt is upon the pulley 13ª and the machine is therefore knitting tubular work, the piece 30 occupies the position shown in Fig. 2— that is, its outer end is depressed and lies inward of the outer face of the pulley 13ª and its inner end is elevated so as to maintain the bar in the raised position. Hence as the pulley 13ª rotates the path of the cam thereon is not obstructed by the end of the piece 30. Upon the completion of tubular work the belt is automatically transferred from the pulley 13ª to the pulley 15 by means of devices hereinafter explained. Immediately before this transference of the belt is had a predetermined tappet on the pattern-wheel abuts against the pin on the lever 34, thereby depressing the horizontal arm of the latter and through the consequent movement of the bar 29 projecting the piece 30 outward into the path of the cam 39 on the outer pulley. Therefore as the latter rotates the cam will abut against and raise the opposed end of the piece, thus depressing the inner end of the piece and therewith the bar 29. The pin is thus projected into the perforation in the crank-arm 21, as above stated. Piece 30 is provided on its under edge adjacent to the outer edge of the pulley 15 with a recess 41, which when the piece is projected outward, as just explained, lies in the path of the cam 40 on said pulley. Thus this cam during the rotation of the pulley passes through the recess without impinging against or acting upon the piece 30. The belt is maintained upon the pulley 15 until the reciprocating operation is completed—that is, until, say, the heel of the stocking is finished—whereupon the belt is transferred to the pulley 13ª. Preparatory to this transference, however, a predetermined tappet 38 upon the pattern-wheel strikes the stud on the lever 34 in a manner to raise the horizontal arm of the latter, which, acting upon the bar 29, retracts the piece 30, so as to bring its edge into the path of the cam 40 on the pulley 15. The cam as the pulley rotates acts against this edge to raise the same and therewith the bar 29, which latter through the intermediate connections retracts the pin from the perforation in the crank-arm 21. When the parts are in this position and the belt is upon the pulley 13ª, a tubular web, as, say, the foot of the stocking, is produced, as before. Upon the completion of the foot portion of the stocking the toe portion is formed similarly to the heel, suitably-disposed tappets upon the pattern-wheel acting at the proper times upon the stud of the lever 34 to effect the requisite movements of the parts. When the toe has been formed, the belt is transferred to the middle or loose pulley 14, whereupon the operation of the machine is stopped and the mechanism is in condition for a repetition of the aforedescribed operation—that is to say, to effect the knitting of the leg, heel, foot, and toe of a stocking.

The piece 30 is provided in the proper positions with attachable and detachable blocks or shoes 42, which receive the impact of the cams on the driving-pulleys. The shoes are fitted to offsets 43 in the face of the piece and are held therein by means of screws 44, respectively.

In order positively to retain the bar in the elevated position, I provide it with a spring-hook 45, which is adapted to engage a stud 46 in its path when the bar is raised. When the bar is moved to project the piece 30 outward, the hook is disengaged from said stud. I have provided the arm 27 with a vertical finger 47, which extends in front of the pulley 15, and have provided the latter with a suitably-disposed notch, with which the finger is engaged when the arm is raised and the pulley 15 inactive. The finger thus locks said pulley in place. When, however, the arm is drawn down by the movement of the bar 29, the finger is disengaged from the notch in the pulley, so as to free the latter. The lower end of the finger is preferably pivoted to the arm, the former being held upright by means of a spring 48, secured thereto and to a boss on the arm 27, whereby said finger has a yielding action as it engages the opposed notch in the pulley.

I shall now proceed to describe the construction and operation of the devices which I employ for shifting the belt from one pulley to the other under the circumstances above recited.

49 represents the shipping-lever, through the upper end of which the belt extends. This lever is loosely fulcrumed upon the rocking shaft 26, Fig. 7. Fixed to the latter, adjacent to the lever 49, is a bracket-piece 50, the top of which is formed with a forwardly-extending lug or finger 51 and with a rearwardly-extending angular portion 52. The lug or finger 51 extends in front of the lever, the latter being held yieldingly against the former by means of a spring 53, acting against the vertical member of the portion 52 and against a projection on the lever-arm 49. The spring is supported upon a pin 54, which extends from said projection to and through a perforation in the said vertical member. Thus it will be seen that when the rocking shaft is oscillated, as above described, the bracket-piece 50 throws the shipper-arm from one outside pulley to the other, the belt being thereupon accordingly transferred. It will be seen, also, that when the shipper-lever is adjacent to the pulley 13ª, as represented most clearly in Fig. 7, said arm may be moved inward against the pressure of the spring 53, so as to transfer the belt onto the middle or loose pulley. The arm is thus moved at the proper time by means of a bell-crank lever 55, fulcrumed upon a suitable stud 56, which projects from the supporting-frame. The end of the upper arm of this lever 55 is provided with a set-screw 57, which takes against the depending arm of the shipper-lever, while the free end of the other or horizontal arm of the crank-lever is provided with a stud 58, which extends to or near to the face of the pattern-wheel. The latter is equipped with properly-located tappet-blocks, which are adapted at the proper time during the rotation of the pattern-wheel to impinge against said pin, and thereby raise the adjacent arm of the crank-lever, the other arm of which lever is thus thrown forward in a manner to act upon the depending arm of the shipper-lever.

The pattern-wheel is at rest, excepting just prior to and during the continuance of reciprocating work for the knitting of the heel and toe parts of the stocking—that is, at the termination of the tubular leg and foot portions of the stocking the wheel is given an initial movement preparatory to its actuation step by step for the control of the heel and toe fashioning devices, as will hereinafter appear. The wheel is actuated by means of the following-described mechanism. 59, Figs. 1 and 3, represents a pawl which is adapted to rest upon and engage the teeth of the ratchet-wheel, and 60 is a vibratory arm with which the pawl is pivotally connected. The lower end of the arm is supported upon a suitably-disposed stud 61 on one of the standards of the main frame, while the upper end bears against an antifriction-roller 62 on the lower end of the pitman 22. The arm 60 is pressed normally against the roller by the action of a flat spring 63, which is secured to an adjacent portion of the main frame, whereby when the crank-arm is rotated the arm 60 is vibrated and therewith the pawl 59, which latter being in engagement with the ratchet-teeth will advance the pattern-wheel step by step. To the end that this wheel shall not be moved by the action of the pawl while the machine is continuously knitting tubular work—that is to say, when the crank-arm is simply oscillating—I omit a tooth at each of those points 64 65 in the wheel upon which the tooth of the pawl 59 rests immediately after the formation of the heel and toe parts of the stocking, respectively.

In the drawings the parts are represented in the position which they occupy during the knitting of the tubular leg of a stocking, the tooth of the pawl being indicated as bearing upon the blank 65 in the pattern-wheel. In order to advance the pattern-wheel a distance of one tooth, so as to engage the pawl with such tooth preparatory to the operation of the narrowing and widening devices, and thereby to effect the rotation of the pattern-wheel step by step, I provide on one side of said wheel two teeth 66 67, which project radially beyond the blanks 64 65, respectively, in the pattern-wheel, and thus, so to say, preserve the continuity of the series of teeth in the latter. Sustained above and out of action with the tooth 67 is the tooth of a pawl 68, which is connected with and operated by the arm 60 similarly to the pawl 59. The pawl 68 is held elevated by means of a spring-supported vertical rod 69, with which it is connected by means of a link 70 and rigid arm 71. This rod is fitted to suitably-disposed guide-brackets 72 on that side of the main frame beneath the base 6, the lower bracket containing a spiral spring 73, upon which bears the end of the rod. The spring thus normally raises the rod, and consequently the pawl 68. It will be obvious that if this rod be depressed the tooth of said latter pawl will engage the opposed tooth 67 and that as the pawl is reciprocated it will impel the pattern-wheel, thereby bringing a tooth of said wheel into engagement with the pawl 59. Hence as this latter pawl is vibrated it will advance the wheel tooth by tooth until the following blank 64 in the teeth is reached, whereupon the wheel will remain quiescent until the pawl 68 is engaged with the tooth 66 adjacent to said blank, it being understood, of course, that this pawl is raised to its normally inactive position immediately after the tooth 66 has been acted upon thereby. The rod 69 is depressed at the proper stages by means of a weight $x$ $x$, Fig. 2, suspended from the knitted web, the rod being provided with two arms 74 75, that project into the path of the weight as the latter descends. These arms are acted upon by the weight preparatory to the knitting of the heel and toe, respectively. The upper arm 74 is pivoted to a boss 76 on the rod 69, and is provided with a rear extension 77, which extends under and takes against a rigid pin 78 on a fixed parallel rod 79. When the extension is against this pin, the arm extends outward horizontally into the vertical path of the weight. When the weight impinges against the top of the arm, it depresses the latter and therewith the rod 69, and when the arm is depressed it naturally releases the extension from the pin, whereupon the arm 74 swings down out of the path of the weight and permits the rod to be elevated by the action of the contained spring 73. This done the weight descends a distance equal to the predetermined length of the heel and foot, whereupon it strikes the opposed lower arm 75 on the rod and depresses the same with the effect above mentioned. The lower arm may be rigid, as the weight need not necessarily escape the same. The bosses on these arms 74 75, together with that from which the pin 78 projects, are fixed to their respective rods by means of set-screws 80, so that the parts may be vertically adjusted as occasion may require. Preparatory to the knitting of a succeeding stocking the arm 74 is raised by the operator to its original position.

Although the foregoing-described mechanism may be used in connection with any appropriate devices for controlling the positions of the needles during the operation of knitting the stocking, I prefer to use needle-controlling mechanism of substantially the same character as that represented in my aforesaid patent, together with intermediate transmitting devices therefor—such, for example, as those which I shall hereinafter describe.

The needle-controlling mechanism is of the following construction:

81 is a tubular cylinder fitted to the elongated lower portion of the needle-cylinder 1 and provided on its exterior surface with a pair of step-sections 82 83, one of which, 83, is movable vertically upon said cylinder 81. The outer edge of these sections diverge from the top to or near to the bases thereof, the series of steps being formed upon the diverging edges. Disposed upon the lower portion of the periphery of the cylinder 81, so as to meet the outer lateral edges of the bases of the sections 82 83, respectively, is a section 84, the upper edge of which lies normally on a plane just below the lowest steps of the sections 82 83. 85 represents the series of subjacks fitted to the lower ends of the grooves for the main jacks 5 in the cylinder 1. These subjacks lie just back of the main jacks 5, and they (said subjacks) are provided with bent upper ends, which project through and beyond openings 86 in said cylinder. When the machine is knitting circular work, the cylinder 81, with its sections, is in the extreme upward position, the upper edge of the section 84 lying just above the line of perforations 86 in the needle-cylinder, thus pressing and maintaining the subjacks outwardly in a manner to hold the main jacks 5 in position to be operated by the knitting-cams. Upon the completion of the circular work the cylinder 81, with its sections, is moved downward a distance of one step, whereupon the upper edge of the section 84 is below the perforations 86, and the bent ends of the subjacks are free to move inwardly to permit the butts of the jacks to be moved out of the path of the knitting-cams. These butts are pressed back out of action by means of spring-actuated levers 87, pivoted on the cam-cylinder beyond the respective sides of the knitting-cams. The ends of these pressure-levers are fitted to a suitable groove cut in the periphery of the needle-cylinder. Two levers are provided, so that as the cam-cylinder is rotated or oscillated the jacks of the needles that are not required for knitting are forced out of action, as fully set forth in my previous patent. In the first revolution of the cam-cylinder after the subjacks have been freed one-half of the needles are moved out of action. Preparatory to the reverse stroke of said cylinder the inner cylinder 81 and therewith the sections 82 and 84 are lowered one step, thereby freeing the subjack which rests against the first or lowest step of the section 82. In this stroke of the cylinder the needle-jack which is controlled by the subjack will be thrown out of action. Preparatory to the following or return stroke of the cam-cylinder the section 83 is lowered one step, thereby freeing the subjack which rests against the first or lowest step of the section 83. Hence in this latter stroke of the cam-cylinder the needle-jack which is controlled by the subjack will be thrown out of action. During the reciprocation of the cam-cylinder the sections are alternately lowered step by step in the manner just described until the required amount of narrowing has been accomplished, whereupon the sections are alternately raised step by step in order to return the previously-outthrown jacks successively into action with the knitting-cams to effect the widening operation, and thus complete the formation of the pouch.

It will be seen that the above-described step devices do not differ materially in their construction and operation from the like devices set out in my former patent.

Depending from the sections 83 and the cylinder 81 are two parallel bars 88 88', which extend along the side of the main frame, suitable brackets 89$^a$ for the bars being provided. These bars are each provided on their outer edges with two sets 89 90 of oppositely-pitched ratchet-teeth which are adapted to be engaged by a double-acting dog 91, adjacent thereto. There are therefore two dogs. They are pivoted about midway between their ends to the expanded lower portion of an oscillatory arm 92, whereby the dogs may be vibrated in a manner to engage or disengage their ends with or from the sets of ratchet-teeth respectively—that is to say, if the lower ends of the dogs be engaged with the lower sets 90 of ratchet-teeth their upper ends will be disengaged from the upper sets of teeth, and the converse. It will be obvious that if the lower dogs be engaged with the sets of teeth and the arm be oscillated the said dogs will move the bars step by step downward alternately, and that if the dogs be engaged with the upper sets of teeth and be likewise oscillated the said dogs will move the bars step by step upward alternately.

The arm 92 is pivoted at 93 to a horizontal bar 94$^a$, one end of which is fulcrumed on the stud 61, while the other end extends to the front of the machine and has pivoted thereto an upright arm 94, whereby when the said latter arm is depressed the bar and its connections will be similarly moved. This arm 94 is connected, by means of a stud 95, with an inclined cam-slot 96 in a horizontally-sliding bar 97, one end of the latter being united with an arm 98 on the end of the rocking shaft 26. The shape of the cam-slot is such that when the bar 97 is projected endwise by the movement of the rocking shaft during the transference of the belt from the pulley 13$^a$ to the pulley 15 the arm 94 is depressed, thereby imparting the requisite initial movement to the step-sections within the needle-cylinder.

Arm 94 is guided in its vertical movement by means of a vertical slot 98$^a$ in a part of the main frame, through which slot the stud 95 extends, and bar 97 is guided in its horizontal movement by means of a suitably-disposed recessed piece 99, through which the free end of the bar extends. The upper portion of the pivoted arm 92 is recessed lengthwise for the reception of an upright arm 100, which is pivoted therein at $x$, so that the upper end of said arm 100 may be oscillated edgewise. This end of the latter arm is normally projected outward by means of a flat spring 101, the lower end of which is secured to the arm 92, while its upper or free end, which is bent inward, projects through an opening in said arm 92 in a manner to act against the oscillatory arm 100. The upper end of the latter is notched to form a shoulder 102, which is normally projected upon the edge of a cross-bar 103, suitably disposed on the main frame. It will be obvious that if the arm 100 be vibrated laterally the arm 92 and its connections will be correspondingly actuated with the aforementioned effect of operating the needle-controlling sections. Said arm is adapted to be vibrated by means of a cam 104, fixed on the transverse shaft 13. When the notched end of the arm 100 is projected upon the bar 103, said arm is out of the path of the cam 104; but when the arm is forced inward against the action of the spring 101 the upper end thereof lies in the path of the cam and the latter perforce in its movement abuts against and actuates the arm. When arm 100 is supported upon the bar 103, the cam is rotating—that is to say, the machine is knitting circular work—and when the arm is released from this bar, the cam is oscillating—that is, the machine is knitting fashioned work. The notched end of the arm is freed from the upper beveled edge of the bar 103, when the arm 92 is forcibly depressed, as above described, preparatory to the commencement of the widening and narrowing process, the notched end of the arm thus bearing against the inner side of the bar 103 and being maintained thereby in the path of the oscillating cam 104. When the widening and narrowing operation has been accomplished, the parts are returned to their former position by the transference of the belt from the pulley 15 to the pulley 13ᵃ—that is to say, the cam-slot 96 on the bar 97 will during the retracting of the latter raise the arm 94 and the parts connected therewith. As a simple and efficient means to hold the bars 88 temporarily in position as they are impelled step by step by the before-described dog mechanism, I serrate the lower outer edges of said bars, respectively, and affix to the main frame 7 in proximity to these serrated edges bracket-pieces 106, in which are contained spring-actuated plungers 107, whose pointed outer ends successively engage the serrations as the bars are actuated.

In order positively to lock the notched arm 100 in the position which it is caused to assume at the completion of the widening and narrowing operation, so as to insure its being in proper position at the outset of the succeeding operation of narrowing and widening, I provide the arm 92 with an extension 105, which projects against the side of one of the standards of the main frame, and I provide said extension and the standard with perforations that are in register when the last stroke is imparted to the arm 93. I also provide the end of the sliding bar 97 with a bend which extends in front of the perforated standard and equip this bend with a suitably-disposed pin 108, (the head or knob of which appears in Fig. 2,) which as the bar is reciprocated is alternately projected into and retracted from the perforations in the standard and extension. Obviously when the pin is projected into said perforations it locks the arm 92 and its adjuncts in place, and when it is retracted therefrom it frees said parts.

A means which I employ for controlling the positions of the pivoted dogs at the predetermined intervals, so as to engage them with the vertical bars 88 88', is shown most clearly in Figs. 4 and 6 as follows: The dogs are provided on their inner edges immediately in front of the pivots with projections 109, respectively, in which are V-shaped recesses 110. Fitted to these recesses are the pointed ends of a block 111, which, if it be depressed, will act upon the recesses in a manner to throw inward the upper and outward the lower ends of the dogs, and which block, if it be raised, will reverse the action of the dogs. The block is held normally in position by means of two spring-actuated plungers 112 113, which bear against its upper and lower edges, respectively. These plungers and their springs are contained in suitably-disposed cases on a vertical arm 114, which is attached at its lower end to the arm 115 of a bell-crank lever. The latter is fulcrumed on a standard of the main frame. The free end of its arm 115 is provided with a stud 116, which projects to or near to the face of the pattern-wheel, and the latter is provided with tappets, which are adapted at predetermined intervals to abut against said stud, and thereby raise the same and the arm 115 of the lever. When said arm is raised, the plunger and perforce the block therewith are correspondingly raised with the effect aforementioned. The upper portion of the arm 114 is provided with vertical guide-pins 117, which extend through suitable perforations in a cross-bar 118. It will be obvious that when the arm 92, with its dogs, is depressed at the beginning of the fashioning operation, the block 111, as it is acted upon by the lower plunger, will act to reverse the positions of the dogs—that is, to throw their lower ends into engagement with the adjacent ratchet-teeth and their upper ends out of engagement with the upper sets of teeth. The springs s s, which cushion the plungers, are contained in their respective cases by means of screw-heads 119, which may be screwed in or out to regulate the pressure of said springs. The screw-head in the upper case is provided with a depending pin 120, which may be forced hard down upon the opposed end of the plunger should occasion require it. The lower end of the depending arm of the crank-lever is provided with a tubular projection or boss, in which is contained a spring-actuated pin 121, which bears against the side of the main frame, so as to hold the lever in the positions which it may be caused to assume by the action of the pattern-wheel. (See Fig. 4ᵇ.)

122 is simply a counterpoise connected with the bar 88' of the cylinder 81 by means of a cord 123, which passes over suitably-located pulleys 124 on the main frame.

As a simple and efficient means whereby a gradually-increasing tension may be applied to the thread during the knitting of, say, the "calf" portion of the stocking, so as to fashion or taper such portion, I have devised mechanism of the following description:

125 indicates a post which is fixed to the base 6, and 127 an inwardly-extending arm on the upper end of said post.

128 is the usual spring-controlled take-up lever, through the hooked forward end of which the thread passes on its way from the bobbin 129 to the thread-carrier 130. Upon this arm is fixed a U-shaped bracket-piece 131, the upper projecting members of which are perforated to receive and guide the thread on its passage to the take-up lever. Extending transversely below these perforations is the bent upper end of a vertically-movable rod 132, which end may thus be moved up against the thread, so as to increase the tension of the latter, or may be retracted therefrom, so as to free the thread and remove the tension. It will be obvious that if the end of the rod be gradually moved upward against the thread and the latter thus be accordingly raised the tubular web as the knitting proceeds will be gradually tapered inward or fashioned.

Those devices which I prefer to use for the purpose of controlling the rod are very simple in their construction, as follows: Secured on that end of the main frame adjacent to the depending rod 132 is a bracket-piece 133, in which is borne a shaft 134. On this shaft are fixed a ratchet-wheel 135 and sprocket-wheel 136, the former being adapted to be intermittently rotated by a pawl 137, which is connected with and reciprocated by an eccentric 138 on the shaft 13. The sprocket-wheel carries a chain 139, which is adapted to be advanced step by step by the action of the ratchet-wheel. Fulcrumed on this bracket at $z$ is a transverse lever 140, one arm of which rests upon the pattern-chain, while the other arm, which is slotted or bifurcated, rests upon a suitably-disposed collar 141 on the rod 132. A spring 142 is interposed between two collars 143 144 near the lower end of the rod, the upper collar 143 being fixed and the lower collar being loose and resting upon an arm $144^a$, through which the lower end of the rod extends. The spring thus tends to force the rod upward and press the collar 141 against the opposed arm of the lever 140. Hence the other arm of this lever is pressed down upon the pattern-chain. This chain is provided with a series of uniform links $a$, which are of such height as to hold the arm of the lever in a position to insure the depression of the rod 132 against the action of the spring 142. It is provided also with a gradually-tapering series of links $b$, which as they are successively brought below the lever-arm permit the rod to be gradually raised by the action of the spring 142, with the effect aforementioned. The tapering series is succeeded by a series of uniform links $c$, which are brought into action during the knitting of the ankle, so as to permit the formation of a straight tubular portion. Following this low series is the uniform series of high links $a$. The latter are brought into play when the ankle portion has been formed, so as to remove the tension from the thread during the knitting of the heel, foot, and toe portions of the stocking. In order to obviate the necessity of using a large number of these high links to maintain the rod 132 depressed during the knitting of the last-named portions of the stocking, there are provisions whereby the pawl shall be disengaged from the ratchet-teeth just after the high links have been brought below the lever-arm and whereby the pawl shall be reëngaged with said teeth during the formation of the tubular leg portion of the succeeding stocking, as follows: Fixed to the pawl 137 is an arm $143^a$, which is inclined downwardly in proximity to one side of the pattern-chain. A predetermined link $d$ of the high series is provided with a laterally-projecting stud $144^b$, which is adapted as it approaches said arm $143^a$ to be projected below the free end of the latter, and thus force this arm and the pawl backward. This being done, the pawl is disengaged from the teeth of the ratchet-wheel, which wheel and the chain thereupon remain idle until the stud is retracted from the arm $143^a$. Upon the withdrawal of this stud the pawl is reëngaged with the ratchet-teeth by the action of a spring 145, secured to the bracket. The stud is projected below the end of the arm $143^a$ by means of a bell-crank lever 146, the upper arm of which is provided with a U-shaped member 147, that lies just in front of the arm $143^a$. The links of the chain pass through said member in their upward passage. The lower arm of the lever extends on one side of the pattern-wheel, and the latter is provided with suitably-disposed tappets 148 149, which are adapted at the proper periods to actuate this arm. When the studded link enters the member 147, one of these tappets strikes and depresses the adjacent lever-arm, thereby moving inward the upper arm, the back of the U-shaped member thereon thus abutting against and projecting outward said link, as above described. At the stated time the other tappet impinges against and raises the arm, thereby retracting the member from the link $d$ and permitting the latter to return to its normal position.

The arm $144^a$, which supports the spring 142, is fixed to one end of the rocking shaft 26, so that as said shaft is oscillated the arm $144^a$ is moved down and up alternately—that is to say, when the belt is transferred from the pulley $13^a$ to the pulley 15 the arm is moved downward, and the converse. The length of the spring is such that when the arm is down the spring does not press forcibly upon the fixed collar 143; but when the arm is raised pressure of the spring is exerted. This construction last described is to the end that a uniform tension may be applied to the thread during the knitting of the leg and foot portions of those socks or stockings in which the fashioning feature is dispensed with. Preparatory to the knitting of of such goods the tension devices are thrown out of action by forcibly depressing the rod 132 and swinging the slotted or bifurcated arm of the lever 140 downward out of engagement with the collar 141 on the rod, as indicated by broken lines in Fig. $3^a$. This being accomplished, the rod is elevated and the tension applied by the upward movement of the arm during the knitting of the leg and foot portions of the sock and depressed and the tension removed by the downward movement of the arm during the knitting of the heel and toe parts of the sock.

The knitting-cams of this machine are identical with those of previous construction, excepting, however, that the central V-cam $4^a$ instead of being fixedly secured to the cam-carrier, as formerly, is preferably pivoted thereto, as at $y$. Hence this cam when it strikes the butts of the jacks during the operation of the carrier is swung backward, so as to close the gap between the same and the opposed side cam $4^b$. Obviously when the carrier is reciprocated the pivoted cam is swung from side to side alternately in a manner to open and close the lateral gaps successively.

I sometimes dispose below the side cams spring-controlled arms $4^c$, respectively, which act as cushions to receive the impact of the needles as they are discharged from said cams. These arms are provided with studs $4^d$, which extend through and beyond perforations in the cam-carrier, the outer ends of the studs being equipped with arms $4^e$, that are connected by a spiral spring $4^f$, which tends to draw the arms toward each other, and thus to maintain the inner arms yieldingly raised.

As a means whereby the section 84 may be lowered a distance of one step when the parts are in the tube-knitting position, so that one-half of the jacks may be thrown out of active position to provide for the removal of the needle-cylinder from the machine, I make said section movable vertically on the cylinder 81 and provide the latter on its inner face with a cam-lever $145^a$, which is so connected with the section that when said lever is properly manipulated the section may be lowered or raised. The upper arm of the lever is provided with a cam-slot $146^a$, with which engages a screw or pin $147^a$, projecting from the section through a vertical slot in the cylinder 81. (See Figs. 11 and 12.)

The general operation of the machine above described may be summarized as follows: Assuming the cylinder 81, with its sections 82 and 83, to be in the extreme upward position and the entire circular series of needle-jacks to be in active position in respect to the knitting-cams on the cam-cylinder and assuming also the thread to be "set up" on the needles and the driving-belt to be running upon the pulley $13^a$, the cam-cylinder will be revolved continuously about the needle-cylinder in a manner to actuate the needles for the production of the tubular leg of the stocking. During this operation the arm 21, being unlocked from the wheel 18, will freely oscillate, and in its oscillations the arm 60, with its pawls 59 and 68, will be reciprocated; but as the pawl 59 is at this stage playing idly in one of the blank peripheral spaces in the pattern-wheel and as the pawl 68 is sustained above and out of engagement with the adjacent lateral tooth on the wheel it follows that said wheel is quiescent. As the knitting of the leg proceeds the weight $x\ x$, suspended therefrom, accordingly descends and at or about the completion of the leg strikes the arm 74 on the rod 79, thereby depressing the latter and tripping the arm. Thus the pawl 68 is moved into engagement with the adjacent lateral tooth on the pattern-wheel, and the latter is advanced to bring one of its peripheral teeth into engagement with the pawl 59, whereupon the wheel is racked step by step until the pawl reaches the other peripheral blank in the wheel. Upon the engagement of the pawl 59 with the teeth of the pattern-wheel the rod 79 rises and again lifts the pawl 68. In the rotation of the pattern-wheel one of the tappet-blocks 38 thereon impinges against the stud 36 on the horizontal arm of the lever 34, thus rocking the latter, and with it the vertical bar 29, thereby unlatching from the stud 46 the spring sustaining-hook 45 on said bar and at the same time moving the oscillatory piece 30 to project its outer end into the path of the segmental cam 39 on the pulley $13^a$. Hence as the latter rotates the cam thereon impinges against and raises the opposing end of the piece 30, thereby depressing the inner arm of the latter and also the vertical bar, which latter, in virtue of the connection 27, turns the rock-shaft 26 in a manner not only to interlock the bolt or pin 23 with the perforation 24 in the oscillating arm 21, but also to transfer the belt from the pulley $13^a$ to the pulley 15. Hence the spur-wheel 18 will be driven, and the arm 21 will be rotated thereby, which arm through the pitman 22 will reciprocate the gear 10, and consequently through the intermediate gearing effect rotary reciprocations of the cam-cylinder and of the shaft 13. As the belt is transferred from the pulley $13^a$ to the pulley 15 the bar 97 is shifted endwise, its cam-slot and pin connection with the arm 94 effecting the depression of the latter and of the horizontal bar $94^a$, thus lowering the bars 88 88' and the cylinder and sections carried thereby, whereupon the upper edge of the section 84 lies below the perforations 86 in the needle-cylinder, so as to clear the bent ends of those subjacks that control the half-series of jacks which are rendered inactive preparatory to the fashioning operation. The butts of the jacks are pushed out of action in respect to the knitting-cams by the pressure-levers 87 during the rotation of the cam-cylinder. By the depression of the bar $94^a$, as just stated, the notched upper end of the spring-controlled arm 100 on the pivoted arm 92 is disengaged from the supporting cross-bar 103 of the main frame and correspondingly lowered, the face of the arm 100 bearing against the opposing side of said cross-bar. The upper end of the arm 100 thus lying in the path of the cam 104 on the reciprocating shaft 13 will be oscillated thereby, and in consequence the arm 92 and the dogs 91 thereon will be correspondingly actuated. The lower ends of the dogs are engaged with the rack-teeth on the bars 88 88' through the upward movement of the lever 115, which carries the dog-controlling block 111, such upward movement being imparted to the lever by an appropriate tappet on the pattern-wheel. As the arm 92 and the dogs thereon are oscillated the latter operate upon the teeth of the respective bars 88 88' in alternate succession in a manner to move said bars and their sections downward step by step alternately, which sections perforce during the reciprocations of the cam-cylinder effect the release and consequent inaction one by one of the jacks which control the end needles of the fashioning sets. These jacks are rendered inactive in prescribed order in respect to the knitting-cams until the requisite narrowing of the web has been accomplished, whereupon a tappet on the pattern-wheel engages and depresses the arm of lever 115, so as to lower the block 111 and reverse the positions of the dogs—that is, to engage their upper ends with the ratchet-teeth on the respective bars 88 88'. As the reciprocations of the cam-cylinder and the oscillations of the dogs continue, the said bars and their connected sections are raised step by step in alternate succession, thus effecting the return to action in proper order of the end series of jacks until the requisite widening of the web has been effected. In the final upward stroke of the bar 88' the half-series of jacks first thrown out of operation are returned to action. At this stage the second blank peripheral space on the ratchet-wheel is in proximity to the pawl 59, and a tappet on said wheel engages the lever 34, so as to rock the latter, and with it the vertical bar 29, thus shifting the piece 30 inward into the path of the segmental cam 40 on the pulley 15. The cam rides against and raises the opposing arm of said piece, thereby lifting the bar 29 (and engaging the spring-hook 45 with the stud 46) and in consequence turning the rock-shaft 26 and shifting the belt from the pulley 15 to the pulley 13$^a$. At the same time the pin or bolt is retracted from the arm 21, which is now free to oscillate. At this stage the pawl 59 has reached the second blank peripherial space on the pattern-wheel and the rotation of the latter ceases, the other pawl 68 lying above the adjacent lateral tooth. Circular knitting then commences and continues until the tubular foot of the stocking has been completed, whereupon the depending weight $x\, x$ on the web bears upon the arm 75 and depresses the same and the rod 69, thus moving the pawl 68 into engagement with the adjacent lateral tooth to impart the initial movement to the pattern-wheel, following which the several parts operate to produce the toe of the stocking in precisely the same manner as above described in respect to the formation of the heel. At the completion of the toe a tappet-stud on the pattern-wheel abuts against the stud 58 on the crank-lever 55, so as to rock the latter and the belt-shipper in a manner to transfer the belt onto the middle or loose pulley 14. The operation of the machine is thereby arrested, the pawl 59 being in contact with a blank peripheral space on the ratchet-wheel and the several parts being in condition for a succeeding operation.

Should it be desired to fashion the leg of the stocking, the lever 140 of the fashioning devices is thrown into action with the pattern-chain 139, and in consequence the following operation takes place: The pawl 143$^a$ is being continuously reciprocated during the operation of the machine. In the knitting of the upper portion of the leg this pawl is in engagement with the teeth of the ratchet-wheel 135, and therefore the sprocket-chain 139 is being advanced step by step. At this stage the high links $a$ are in action, and the tension-rod 132 being in consequence depressed the knitting-thread is relieved from tension. These high links are followed by the gradually-tapering series of links $b$, which are successively moved into action during the advancement of the chain, so as to effect a gradually-increasing tension on the thread for and during the formation of the fashioned "calf" portion of the stocking-leg. Following these high links $b$ are the uniform links $c$, which act during the formation of the ankle portion. Then follow the links $a$, which are brought into play when the ankle portion has been formed, so as to remove the tension during the knitting of the heel, foot, and toe portions of the stocking. During the knitting of the heel, &c., the stud 144$^b$ on one of the high links acts against the arm 143$^b$ in a manner to raise the pawl 143$^a$ out of engagement with the ratchet-wheel. Thereupon the motion of the chain ceases. As above explained, the pattern-wheel is rotating during the formation of the toe. Just at or prior to the last step of the pattern-wheel the lever 146 is actuated to throw the studded link out of engagement with arm 143$^a$, the pawl thus reëngaging the ratchet-wheel preparatory to advancing the remainder of the high links $a$ during the knitting of the upper portion of the leg of a succeeding stocking.

I claim—

1. The combination with two wheels and their supporting parts, of an oscillatory arm connected with one of said wheels, a transmitting device connecting said arm with the other wheel, and locking and releasing mechanism for said arm, substantially as described.

2. The combination with two wheels and their supporting parts, of an oscillatory arm connected with one of said wheels, a transmitting device connecting said arm with the other wheel, a pin or bolt adapted to lock the arm to the wheel, and mechanism for operating the pin or bolt in a manner to lock or release the said arm, substantially as described.

3. The combination with two wheels and their supporting parts, of an oscillatory arm connected with one of said wheels, a transmitting device connecting said arm with the other wheel, a pin or bolt adapted to lock the arm to the wheel, a rocking shaft connected with said pin or bolt, and means for oscillating said shaft so as to operate the pin or bolt, substantially as described.

4. The combination with two wheels, their supporting parts, and independent driving mechanism for said wheels, of an oscillatory arm connected with one of said wheels, a transmitting device connecting said arm with the other wheel, locking and releasing mechanism to lock said arm and release it from its wheel, and means for actuating said locking and releasing mechanism upon the operation of the driving mechanism, substantially as described.

5. The combination of a spur-wheel, its shaft, a pinion engaging said spur-wheel, a shaft for said pinion, and operating devices therefor, a gear loosely mounted on said latter shaft, and means for independently operating said gear, a spur-wheel engaging said gear, an oscillatory arm on said latter wheel, a transmitting device connecting said arm with the first-mentioned spur-wheel, and locking and releasing mechanism to lock said arm to and release it from its wheel, substantially as described.

6. The combination with two wheels, their supporting parts, and independent driving mechanism for said wheels, of transmitting devices connecting said wheels, locking and releasing mechanism to lock said transmitting devices to, and release them from one of said wheels, a pattern mechanism, and devices controlled thereby for operating the locking and releasing and the driving mechanisms, substantially as described.

7. A shaft, a pinion and a fast pulley on said shaft, a sleeve thereon, a pinion and a fast pulley on said sleeve, and shipping devices for transferring the driving-belt from one pulley to the other, in combination with two spur-wheels in gear with said pinions respectively, a transmitting device connecting said wheels, locking and releasing mechanism to lock said transmitting devices to and release them from one of said wheels, and means for operating said mechanism, substantially as described.

8. The combination of the driving-pulleys and shipper device, of a shaft connected with said device, a bar connected with said shaft, a movable piece connected with said bar, and cam devices for operating said piece at predetermined intervals in order to effect the action of the bar, substantially as described.

9. The combination of the driving-pulleys and a shipper device, of a shaft connected with said device, a bar connected with said shaft, a movable piece connected with said bar, and cam devices on the edges of the pulleys adapted to operate said piece at predetermined intervals in order to effect the action of the bar, substantially as described.

10. The combination of the driving-pulleys, a shipper device, and supporting means therefor, a sliding oscillatory piece disposed in proximity to the pulleys, a connection between said piece and the shipper-support, and means for operating said sliding piece, substantially as described.

11. The combination of the driving-pulleys, a shipper device and supporting means therefor, a bar, operative means between the bar and the shipper device, a sliding oscillatory piece connected with said bar, cam devices for actuating said piece, and a spring latch or hook adapted to lock said bar in an elevated position, substantially as described.

12. The combination of the driving-pulleys, a shipper device, a rocking shaft connected with said device, a bar operatively connected with said rocking shaft, and means for raising and lowering said bar at intervals, substantially as described.

13. The combination of the driving-pulleys, a shipper device, a rocking shaft connected therewith, a bar connected with said shaft, a movable piece connected with said bar, means for oscillating the same, to raise or lower said bar, and means for oscillating said bar to reciprocate the said piece, substantially as described.

14. The combination of the shaft, the fast driving and the loose pulley thereon, the sleeve on the shaft, and the fixed driving-pulley on said sleeve, a pinion on the shaft and a pinion on the sleeve, a rotatable cylinder, and operative connections between said pinions and the cylinder, the shipper device, means for operating the same to transfer the belt from one driving-pulley to the other, and independent means for operating the shipper device to transfer the belt onto the loose pulley, substantially as described.

15. The combination of the shaft, the fast driving and the loose pulley thereon, the sleeve on the shaft and the fixed driving-pulley on said sleeve, a pinion on the shaft and a pinion on the sleeve, a rotatable cylinder and operative connections between said pinions and the cylinder, the shipper device and means for operating the same to transfer the belt from one pulley to the other, together with means for automatically locking the sleeve-pulley when the belt is removed from the same, substantially as described.

16. The combination of the ratchet-wheel provided with a blank or space at a predetermined part of its periphery, and with a tooth laterally adjacent to said blank or space, a pawl adapted to rest upon the toothed periphery of the ratchet-wheel, and a supplemental pawl adapted to engage the said laterally-disposed tooth, together with means for vibrating said pawls and means for moving said supplemental pawl into and out of action with the tooth, at predetermined intervals, substantially as described.

17. The combination of the ratchet-wheel provided with a blank or space at a predetermined part of its periphery and with a tooth laterally adjacent to said blank or space, a pawl adapted to rest upon the toothed periphery of the ratchet-wheel, a supplemental pawl adapted to engage the said laterally-disposed tooth, means for vibrating said pawl, an outwardly-projecting arm connected with said supplemental pawl and a spring-supported rod sustaining said arm, substantially as described.

18. The combination of the ratchet-wheel provided with blanks or spaces at predetermined intervals on its periphery, and with teeth laterally adjacent to said blanks or spaces, a pawl adapted to rest upon the toothed periphery of the ratchet-wheel, a supplemental pawl adapted to engage said laterally-disposed teeth, means for vibrating said pawls, a spring-actuated rod supporting said arm, and two projecting arms on said rod, the upper one of which arms may be thrown out of active position, substantially as described.

19. The combination of the vertically-movable rod and its supporting parts, of a tilting arm pivoted thereto, means for maintaining said arm in a horizontal position and means to uphold the rod, together with pattern-actuating mechanism, and connections between the same and said rod, substantially as described.

20. The combination of the ratchet-wheel, the main and supplemental pawls, the vibratory arm with which they are connected, the crank-arm adapted to operate said former vibratory arm, and means for actuating said crank-arm, together with a movable rod and a connection between the same and the supplemental pawl, substantially as described.

21. The combination with a needle-bed and its needles, of mechanism adapted to throw said needles into and out of action at predetermined intervals, a bar connected with said mechanism, a dog device adapted to impel said bar, and means for operating said dog device, substantially as described.

22. The combination with a needle-bed and its needles, of a reciprocative needle-controlling mechanism, a bar connected with said mechanism and provided with two oppositely-pitched sets of ratchet-teeth, a vibratory dog device adapted to engage said teeth, and means for operating said dog device, substantially as described.

23. The combination with a needle-bed and its needles, of a two-part reciprocative needle-controlling mechanism, bars connected with the respective parts of said mechanism, ratchet-teeth on said bars, vibratory dog devices adapted to engage said teeth, and means for supporting and operating said dog devices, substantially as described.

24. The combination with the toothed bar, of the pivoted arm, the double-acting vibratory dog thereon, means for vibrating said dog, means for oscillating the arm, and means for raising and lowering the said arm at predetermined intervals, substantially as described.

25. The combination with the toothed bar, of a pivoted dog, a support therefor, an arm connected with said support, a bar having a cam connection with said arm, and means for reciprocating said bar when the driving mechanism is operated to effect the change from circular to reciprocatory work, together with said driving mechanism, substantially as described.

26. The combination with the toothed bars, of the oscillatory arm, the pivoted recessed dogs thereon, the block engaging the recesses of said dogs, the spring-actuated plungers, means for supporting said plungers and means for operating the same, substantially as described.

27. The combination with a needle-bed and its needles, of a reciprocative needle-controlling mechanism, a bar connected with said mechanism and provided with two oppositely-pitched sets of ratchet-teeth, a vibratory dog device, adapted to engage said teeth, and means for operating said dog device, together with means for locking said bar in its positions of adjustment, substantially as described.

28. The combination with the shaft, the cam thereon, and mechanism for operating said shaft, of the longitudinally-movable bar, the dog devices therefor, the oscillatory arm for said devices, and the movable member on said arm adapted to be thrown into and out of the path of the cam at intervals, and means for operating said member, substantially as described.

29. The combination with the longitudinally-movable bar, of a dog device, a support therefor, an arm connected with said support, a bar having a cam connection with said arm, means for reciprocating said bar, and means for locking the dog-support at intervals, substantially as described.

30. The combination with the needle-bed, its needles, the thread-carrier and its support, of a vertically-movable rod over which the thread passes on its way to the carrier, and means for moving said rod to exert a yielding pressure, together with means for retracting said rod from engagement with the thread, substantially as described.

31. The combination, with the needle-bed, its needles, the thread-carrier and its support, of a thread-guide, a tension-rod mounted in proximity thereto, and a spring acting upon said rod to maintain it yieldingly against the thread passing through said guide, together with means for retracting said rod from engagement with the thread, substantially as described.

32. The combination, with the needle-bed, its needles, the thread-carrier and its support, of a reciprocative tension device, a spring tending to maintain said device yieldingly against the thread, and means for gradually releasing said rod to permit the pressure thereof upon the thread to be gradually increased as the knitting proceeds, substantially as described.

33. The combination, with the needle-bed, its needles, the thread-carrier and its support, of a reciprocative tension device, a spring for maintaining said device yieldingly against the thread, and means for compressing and releasing said spring at predetermined intervals, substantially as described.

34. The combination, with the needle-bed, its needles, the thread-carrier and its support, of a tension device, a spring for maintaining said device yieldingly against the thread, a lever acting upon said rod, a pattern-chain coacting with said lever, and means for operating said chain, substantially as described.

35. The combination, with the needle-bed, its needles, the thread-carrier and its support, of a tension device, a pattern-chain, connections between the same and the tension device, a chain-wheel, ratchet-and-pawl mechanism for operating said wheel, a main pattern mechanism, and means controlled thereby for rendering the pawl active and idle at predetermined intervals, substantially as described.

36. The combination with the needle-bed, its needles, the thread-carrier and its support, of a thread-guide, a spring-controlled tension-rod in proximity thereto, a pattern-chain, connections between the same and the rod, the chain-wheel, its shaft, the ratchet-wheel, the pawl, the eccentric, and the shaft for the latter, substantially as described.

37. The combination with the needle-bed, its needles, the thread-carrier and its support, of a thread-guide, a spring-controlled tension-rod in proximity thereto, a pattern-chain, connections between the same and the rod, the chain-wheel, its shaft, the ratchet-wheel, the pawl, the eccentric and the shaft for the latter, together with means for throwing said pawl out of and into engagement with the ratchet-teeth, substantially as described.

38. The combination with the cam-carrier and the knitting-cams therein, of a pivoted cushion-arm disposed below one of the side cams, and having its free end adjacent to the needle-raising incline of the adjacent cam, and means for yieldingly supporting said arm, substantially as described.

39. The combination with the cam-carrier and the knitting-cams therein, of cushion-arms disposed below the side cams, studs projecting from said arms through the wall of the carrier, arms on the outer ends of these studs, and a spring connecting said latter arms, substantially as described.

40. The combination with the cylinder or support 81, of the section 84 vertically movable thereon, the cam-lever mounted on said cylinder or support, and provisions whereby said lever is connected with the section, substantially as described.

In testimony whereof I have hereunto affixed my signature in the presence of two subscribing witnesses.

WILL R. JOHNS.

Witnesses:
WM. F. BALLINGER,
JOHN R. NOLAN.